(No Model.)
P. M. & D. T. SHARPLES.
CENTRIFUGAL CREAMER.
No. 496,622. Patented May 2, 1893.
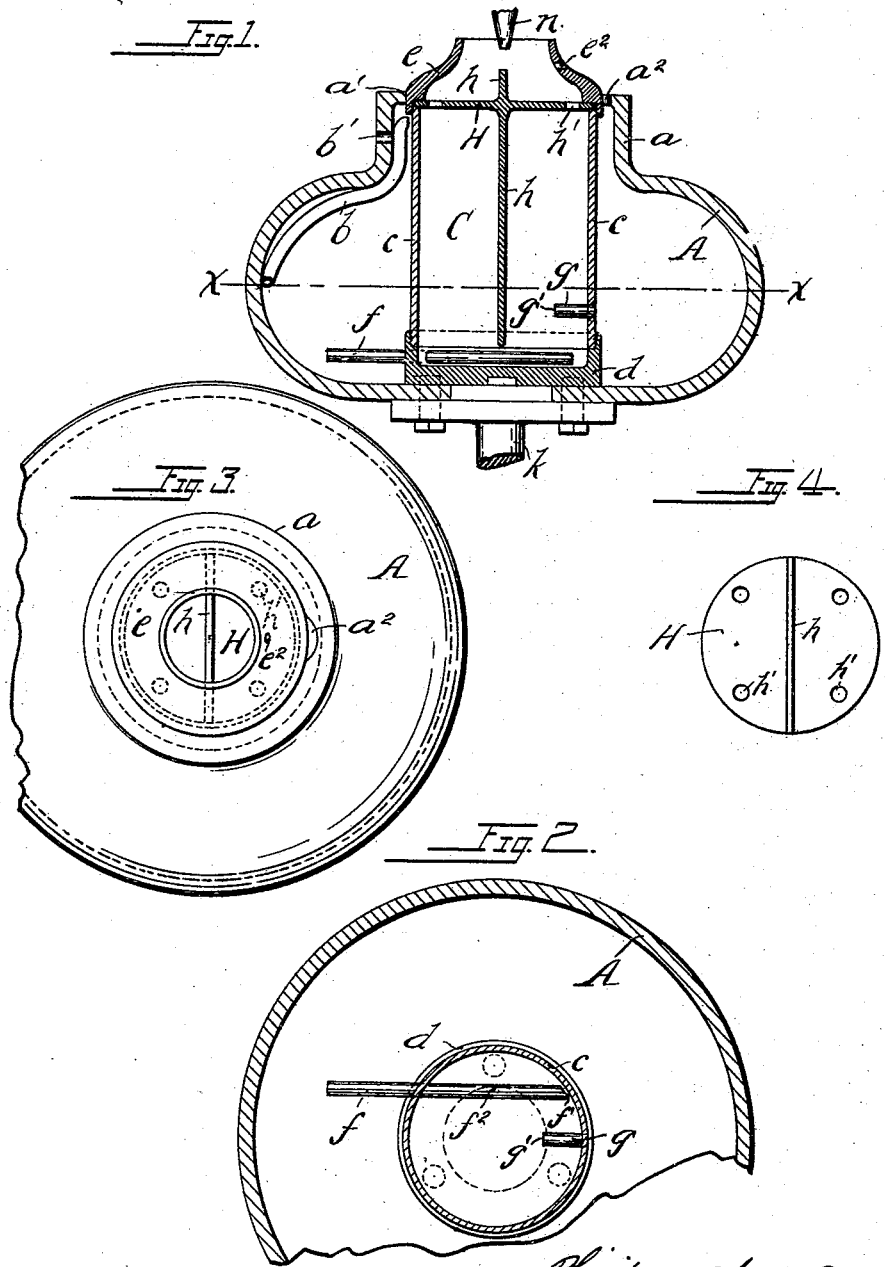

UNITED STATES PATENT OFFICE.

PHILIP M. SHARPLES, OF WEST CHESTER, PENNSYLVANIA, AND DAVID T. SHARPLES, OF ELGIN, ILLINOIS.

CENTRIFUGAL CREAMER.

SPECIFICATION forming part of Letters Patent No. 496,622, dated May 2, 1893.

Application filed April 28, 1891. Serial No. 390,762. (No model.)

*To all whom it may concern:*

Be it known that we, PHILIP M. SHARPLES, residing at West Chester, Chester county, Pennsylvania, and DAVID T. SHARPLES, residing at Elgin, in the county of Kane, State of Illinois, citizens of the United States, have invented certain Improvements in Centrifugal Creamers, of which the following is a specification.

This invention relates particularly to improvements in the process of continuously separating cream from milk and to apparatus for carrying out the same.

In the centrifugal machines now commonly used for separating cream from milk the whole milk is ordinarily fed in a continuous stream into the rotating vessel; the mass of liquid already in the vessel having been subjected to the centrifugal action a longer or shorter time is partially separated but the new milk admitted is continually carrying into the mass of partially skimmed milk numerous particles of cream, which, after they are fairly brought under the influence of the centrifugal action have to work themselves back through this mass of milk to their normal position near the center of rotation.

The main object of our invention is to avoid this constant mixing of the rich cream in the whole milk with the partially skimmed liquid in the vessel. If the bulk of cream in this new milk is separated without combining it with the partially skimmed milk it is evident that the capacity of the machine will be greatly increased and our improved apparatus is designed to permit the separation of the larger and smaller particles of cream to be carried on continuously as separate yet simultaneous operations.

The accompanying drawings in connection with the following description set forth a simple construction involving the features of our invention, which are also pointed out in the claims.

Figure 1 is a cross-section of a well known form of separator vessel having our improvements applied thereto and adapted to carry out our improved process. Fig. 2 is a sectional view on the line $x\,x$ of Fig. 1, the deflector plate and wing being removed. Fig. 3 is a top view of the apparatus shown in Fig. 1. Fig. 4 shows the deflector plate and wing separate.

The main separator vessel A as already stated is of a well known form being provided with an upwardly extending neck $a$ having an inner flange or rim $a'$ at the top and an eccentric depression $a^2$ in said rim which serves as a cream outlet from the vessel A; the usual skim milk pipe $b$ and outlet $b'$ are also shown but the fixed receptacles are omitted.

The vessel is represented as mounted upon a shaft $k$.

It will be noticed that the separation of the lighter and heavier constituents of a compound liquid such as milk may be continuously effected in the vessel as above described in the ordinary manner, a continuous stream of whole milk being admitted directly thereto and the constituents being withdrawn separately through the outlets $a^2$ and $b'$ respectively. Here however is where our improvements apply. Separator vessels have almost necessarily been formed so as to have a large waste space near the center, being provided with a large opening there for convenience in the manufacture and in cleaning; and this space has been of no practical use; by means of our invention however it can be very conveniently utilized, as will now be fully explained.

C is a separator vessel which, as represented, is constructed as follows:—The main body may be a section of wrought tubing screw threaded at either end to permit the connection thereto of the base $d$ and top $e$; the diameter of these corresponds with that of the opening in the main vessel A through which they may be entered. A horizontal deflector plate H having a vertical wing $h$ attached is clamped between the parts $e$ and $c$ of the vessel C, and the base $d$ of the latter is removably secured to the main vessel so as to rotate with it. A cream outlet tube $g$ opens through the wall of the vessel C and extends inward for some distance toward its center. Another outlet tube $f$ likewise passes through the wall of the vessel C and projects some distance into the main vessel A while the portion of it within the vessel C is extended toward the opposite wall to one side of the center until its open end $f'$ is in proximity to said wall as shown.

When in operation the whole milk is admitted through a nozzle $n$ into the primary vessel or receptacle C where it strikes the plate H and is promptly thrown outward toward the periphery of the receptacle C, and is subjected to centrifugal action.

As shown in the drawings that portion of the receptacle above the plate H may be adapted to serve as a separate chamber in which a slight separation of cream may be effected and discharged through an outlet $e^2$ while the main body of the liquid passes below the plate H through openings $h'$; or if preferred the space above and below the plate may be in such communication as to be practically one. The arrangement of the outlet tubes $g$ and $f$ is such that the former will carry off the inner zone of cream in the vessel C and deliver it directly into the main vessel A, while the tube $f$ will convey the partially skimmed milk at the periphery of the vessel C outward some distance into the main vessel;—it being readily understood that while the partially skimmed milk only can enter the open end $f'$ the outlet will be controlled by the distances of the points $g'$ and $f^2$ from the center of rotation, and their relative capacities. It will be seen that a large portion of the cream will thus be separated in the vessel C; the partially skimmed milk will be delivered into the main vessel A and be subjected to the more intense centrifugal action due to the greatly increased diameter of the latter, simultaneously with the preliminary treatment of the whole milk in the primary vessel; the cream separated from the partially skimmed milk in the vessel A will form an inner zone of cream therein into which the portion of cream separated in vessel C is delivered through the tube $g$ and with which the latter is finally discharged through the outlet $a^2$ from the main vessel.

Instead of providing a tube $g$ emptying into the main vessel it is evident that all the cream separated in the vessel C may be readily discharged separately if preferred. It is evident also that the apparatus may be modified in many respects without departing from the spirit of our invention and we do not therefore limit ourselves to the particular construction shown, but

What we claim is—

1. The combination with a centrifugal separating vessel having separate cream and skim milk outlets, of a primary separating receptacle rotating therewith and having separate cream and skim milk outlets arranged to deliver directly into the cream and milk zones respectively of the main separating vessel, substantially as set forth.

2. The combination with a centrifugal separating vessel having a central opening and separate cream and skim milk outlets, of a primary separating receptacle adapted to enter said central opening and secured within the main separating vessel, said receptacle being provided with separate cream and skim milk outlets arranged to deliver directly into the cream and milk zones respectively of the main separating vessel, substantially as set forth.

In testimony whereof we affix our signatures in presence of two witnesses.

PHILIP M. SHARPLES.
DAVID T. SHARPLES.

Witnesses as to the signature of Philip M. Sharples:
   M. L. WALSH,
   M. SHARPLES, Witnesses as to the signature of David T. Sharples:
   M. H. JOSLYN,
   FRANK E. ALLEN.